United States Patent
Umemoto et al.

(10) Patent No.: US 8,656,706 B2
(45) Date of Patent: Feb. 25, 2014

(54) EXHAUST PURIFICATION SYSTEM OF INTERNAL COMBUSTION ENGINE

(75) Inventors: Kazuhiro Umemoto, Susono (JP);
Kohei Yoshida, Gotenba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/259,885

(22) PCT Filed: Sep. 2, 2010

(86) PCT No.: PCT/JP2010/065449
§ 371 (c)(1),
(2), (4) Date: Sep. 23, 2011

(87) PCT Pub. No.: WO2012/029189
PCT Pub. Date: Mar. 8, 2012

(65) Prior Publication Data
US 2013/0192212 A1    Aug. 1, 2013

(51) Int. Cl.
*F01N 3/00* (2006.01)
*F01N 3/02* (2006.01)
*F01N 3/20* (2006.01)

(52) U.S. Cl.
USPC ............ 60/295; 60/286; 60/299; 60/301

(58) Field of Classification Search
USPC ................... 60/286, 295, 299, 301
See application file for complete search history.

(56) References Cited

U.S. PATENT DOCUMENTS

| | | |
|---|---|---|
| 6,327,851 B1 | 12/2001 | Bouchez et al. |
| 7,703,275 B2 | 4/2010 | Asanuma et al. |
| 7,861,516 B2 | 1/2011 | Allansson et al. |
| 2002/0029564 A1 | 3/2002 | Roth et al. |
| 2004/0045285 A1 | 3/2004 | Penetrante et al. |
| 2004/0050037 A1 | 3/2004 | Betta et al. |
| 2004/0055285 A1 | 3/2004 | Rohr et al. |
| 2004/0154288 A1 | 8/2004 | Okada et al. |

(Continued)

FOREIGN PATENT DOCUMENTS

| | | |
|---|---|---|
| JP | A-04-200637 | 7/1992 |
| JP | A-2004-16850 | 1/2004 |

(Continued)

OTHER PUBLICATIONS

Dec. 21, 2010 Search Report issued in the International Application No. PCT/JP2010/065449 (with translation).

(Continued)

*Primary Examiner* — Thomas Denion
*Assistant Examiner* — Dapinder Singh
(74) *Attorney, Agent, or Firm* — Oliff PLC

(57) ABSTRACT

In an internal combustion engine, inside of an engine exhaust passage, a hydrocarbon feed valve (15) and an exhaust purification catalyst (13) are arranged. On the exhaust purification catalyst (13), platinum Pt (51) is carried and a basic layer (53) is formed. At the time of engine operation, a main concentration changing action in which the concentration of hydrocarbons which flow into the exhaust purification catalyst (13) is made to change by a predetermined amplitude ($\Delta HA$) and predetermined period ($\Delta TA$) is performed. Furthermore, before each main concentration changing action, an auxiliary concentration changing action in which the concentration of hydrocarbons is made to change by an amplitude ($\Delta HB$) smaller than the amplitude ($\Delta HA$) at the time of each main concentration changing action is performed.

8 Claims, 15 Drawing Sheets

(56) References Cited

U.S. PATENT DOCUMENTS

| | | | |
|---|---|---|---|
| 2004/0175305 A1 | 9/2004 | Nakanishi et al. | |
| 2007/0151232 A1 | 7/2007 | Dalla Betta et al. | |
| 2008/0223020 A1 | 9/2008 | Yoshida et al. | |
| 2009/0049825 A1 | 2/2009 | Ohashi | |
| 2009/0084091 A1 | 4/2009 | Tsujimoto et al. | |
| 2009/0191108 A1* | 7/2009 | Blanchard et al. | 423/239.1 |
| 2009/0249768 A1 | 10/2009 | Asanuma et al. | |
| 2009/0266057 A1 | 10/2009 | Tsujimoto et al. | |
| 2009/0288393 A1 | 11/2009 | Matsuno et al. | |
| 2010/0115923 A1 | 5/2010 | Tsujimoto et al. | |
| 2010/0126148 A1 | 5/2010 | Morishima et al. | |
| 2010/0132356 A1 | 6/2010 | Lee | |
| 2011/0041486 A1* | 2/2011 | Kato et al. | 60/299 |
| 2011/0047984 A1 | 3/2011 | Lee et al. | |
| 2011/0047988 A1* | 3/2011 | Lewis et al. | 60/295 |
| 2011/0113754 A1* | 5/2011 | Kohara et al. | 60/274 |
| 2011/0120100 A1* | 5/2011 | Yin et al. | 60/295 |
| 2011/0131952 A1* | 6/2011 | Onodera et al. | 60/274 |
| 2011/0173950 A1* | 7/2011 | Wan et al. | 60/274 |
| 2011/0209459 A1* | 9/2011 | Hancu et al. | 60/274 |
| 2012/0122660 A1* | 5/2012 | Andersen et al. | 502/65 |
| 2012/0124967 A1* | 5/2012 | Yang et al. | 60/274 |

FOREIGN PATENT DOCUMENTS

| | | |
|---|---|---|
| JP | A-2004-216224 | 8/2004 |
| JP | A-2004-290965 | 10/2004 |
| JP | A-2005-113801 | 4/2005 |
| JP | A-2006-501390 | 1/2006 |
| JP | A-2007-514090 | 5/2007 |
| JP | B2-3969450 | 9/2007 |
| JP | A-2008-232003 | 10/2008 |
| JP | A-2008-267217 | 11/2008 |
| JP | A-2008-286186 | 11/2008 |
| JP | A-2009-226349 | 10/2009 |

OTHER PUBLICATIONS

Oct. 26, 2010 International Search Report issued in International Patent Application No. PCT/JP2010/063135.

Jan. 18, 2011 International Search Report issued in International Patent Application No. PCT/JP2010/068785.

Jan. 18, 2011 International Search Report issued in International Patent Application No. PCT/JP2010/067707.

Jan. 18, 2011 International Search Report issued in International Patent Application No. PCT/JP2010/067705.

U.S. Appl. No. 13/257,789 in the name of Nishioica et al. filed Oct. 14, 2011.

U.S. Appl. No. 13/263,272 in the name of Bisaiji et al. filed Oct. 6, 2011.

U.S. Appl. No. 13/264,062 in the name of Watanabe et al. filed Oct. 12, 2011.

U.S. Appl. No. 13/260,986 in the name of Watanabe et al. on Sep. 29, 2011.

Office Action dated Oct. 23, 2013 issued in U.S. Appl. No. 13/263,272.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which an exhaust purification catalyst for reacting $NO_x$ contained in exhaust gas and reformed hydrocarbons is arranged inside of an engine exhaust passage, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if the concentration of hydrocarbons flowing into the exhaust purification catalyst is made to change within a predetermined range of amplitude and within a predetermined range of period and has a property of being increased in storage amount of $NO_x$ which is contained in exhaust gas if the vibration period of the hydrocarbon concentration is made longer than the predetermined range, at the time of engine operation, a main concentration changing action in which the concentration of hydrocarbons flowing into the exhaust purification catalyst is made to change within the predetermined range of amplitude and within the predetermined range of period is performed and, furthermore, before each main concentration changing action, an auxiliary concentration changing action in which the concentration of hydrocarbons is made to change by an amplitude smaller than the amplitude at the time of each main concentration changing action is performed.

Advantageous Effects of Invention

Even if the temperature of the exhaust purification catalyst becomes a high temperature, a high $NO_x$ purification rate can be obtained.

DESCRIPTION OF EMBODIMENTS

Figure 1:
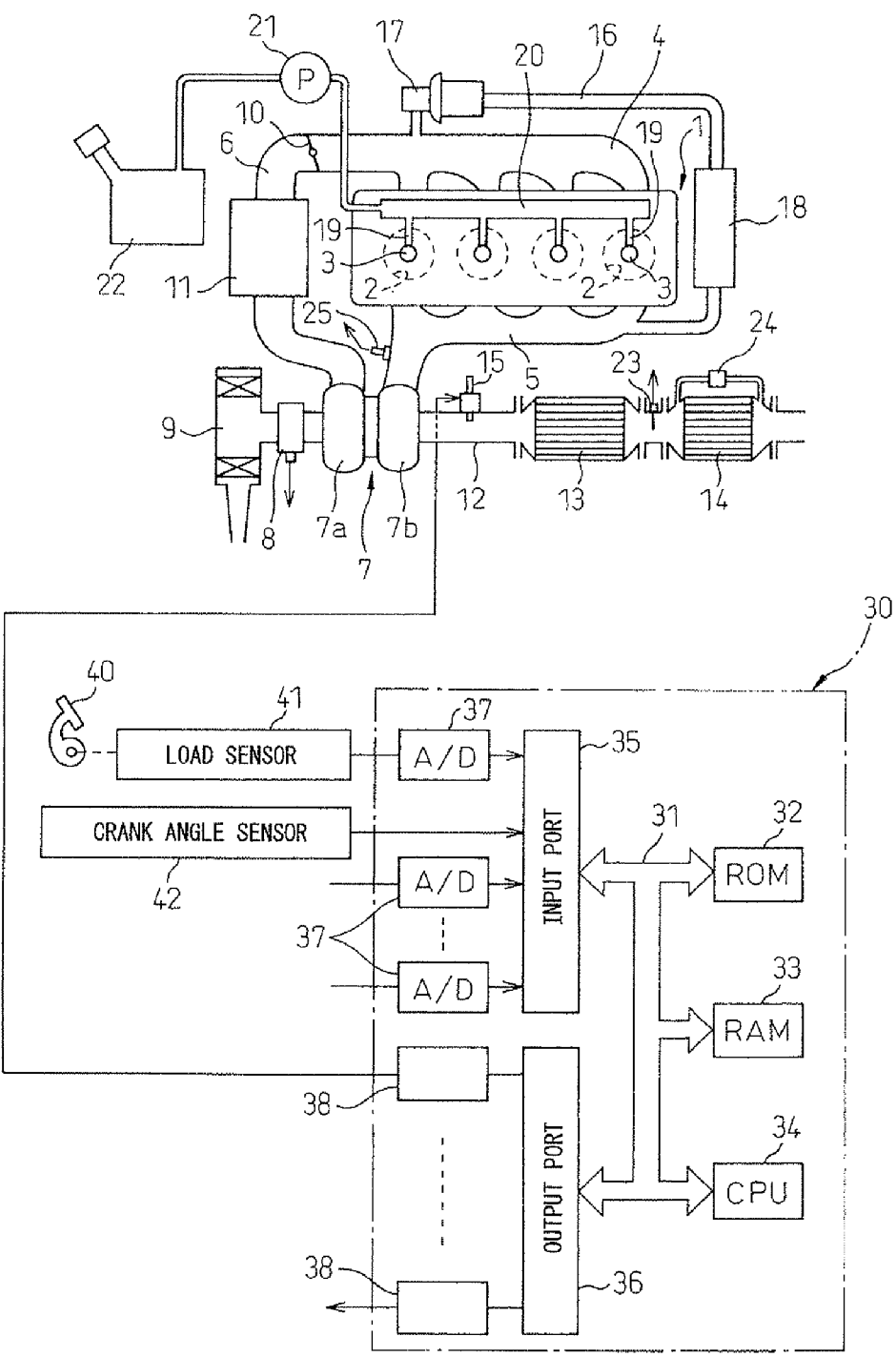
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, while the outlet of the exhaust purification catalyst 13 is connected to a particulate filter 14 for trapping particulate which is contained in the exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 for detecting the temperature of the exhaust purification catalyst 13 is attached. At the particulate filter 14, a differential pressure sensor 24 for detecting a differential pressure before and after the particulate filter 14 is attached. Further, at the collecting portion of the exhaust manifold 5, an air-fuel ratio sensor 25 is arranged. The output signals of these temperature sensor 23, differential pressure sensor 24, the air-fuel ratio sensor 25, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 15, EGR control valve 17, and fuel pump 21.

Figure 2:
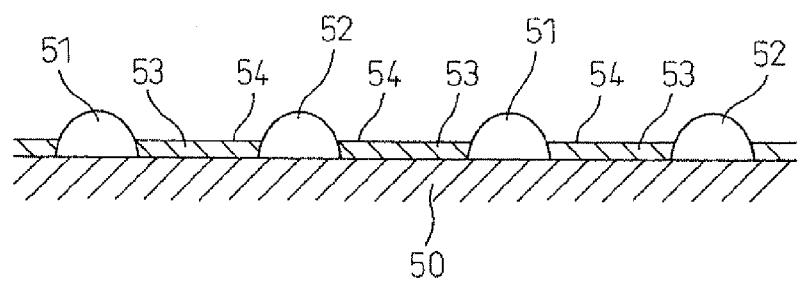
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
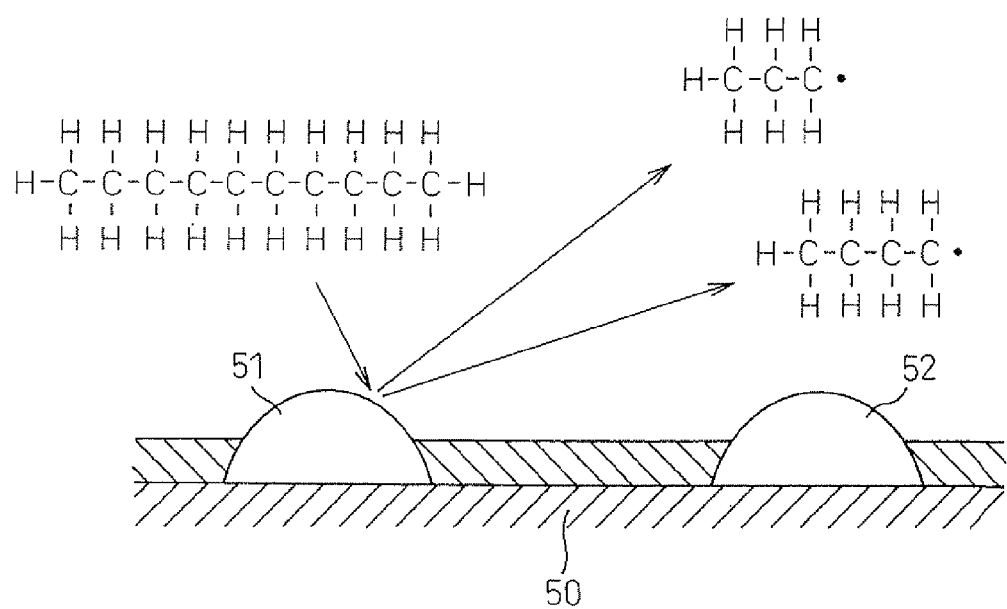
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Figure 4:
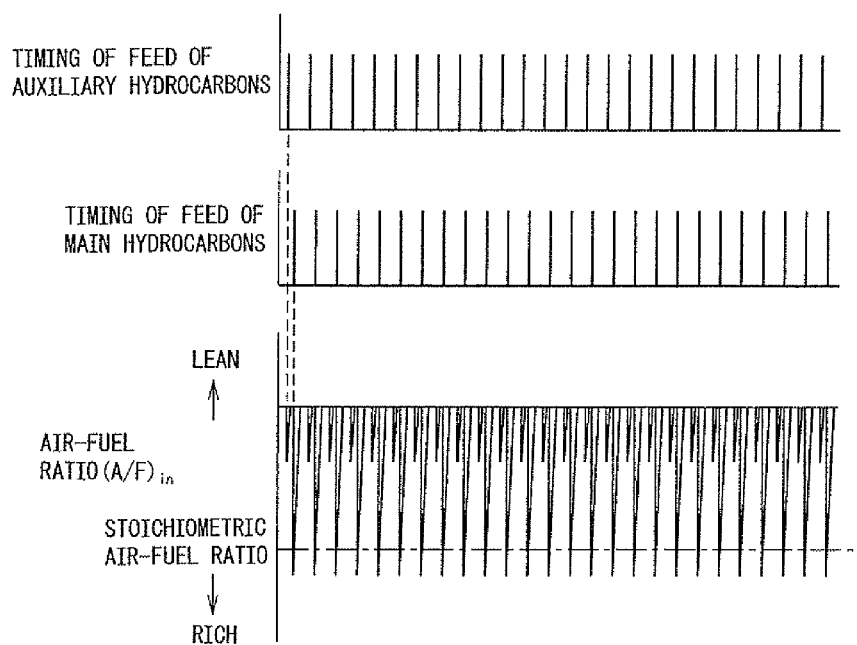
FIG. 4 is a view showing a change of an air-fuel ratio of exhaust gas flowing into an exhaust purification catalyst.

Note that, even if the fuel injector 3 injects fuel, that is, hydrocarbons, into the combustion chamber 2 in the second half of the expansion stroke or exhaust stroke, the hydrocarbons are reformed in the combustion chamber 2 or exhaust purification catalyst 13, and the $NO_x$ which is contained in exhaust gas is removed by the reformed hydrocarbons in the exhaust purification catalyst 13. Therefore, in the present invention, instead of feeding hydrocarbons from the hydrocarbon feed valve 15 to the inside of an engine exhaust passage, it is also possible to feed hydrocarbons into the combustion chamber 2 in the second half of the expansion stroke or exhaust stroke. In this way, in the present invention, it is possible to feed hydrocarbons into the combustion chamber 2, but below, the present invention will be explained with reference to the case of trying to inject hydrocarbons from a hydrocarbon feed valve 15 to the inside of an engine exhaust passage FIG. 4 shows feed timings of auxiliary hydrocarbons and main hydrocarbons from the hydrocarbon feed valve 15 and the change in the air-fuel ratio (A/F)in of the exhaust gas flowing into the exhaust purification catalyst 13. Note that, the change in the air-fuel ratio (A/F)in depends on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
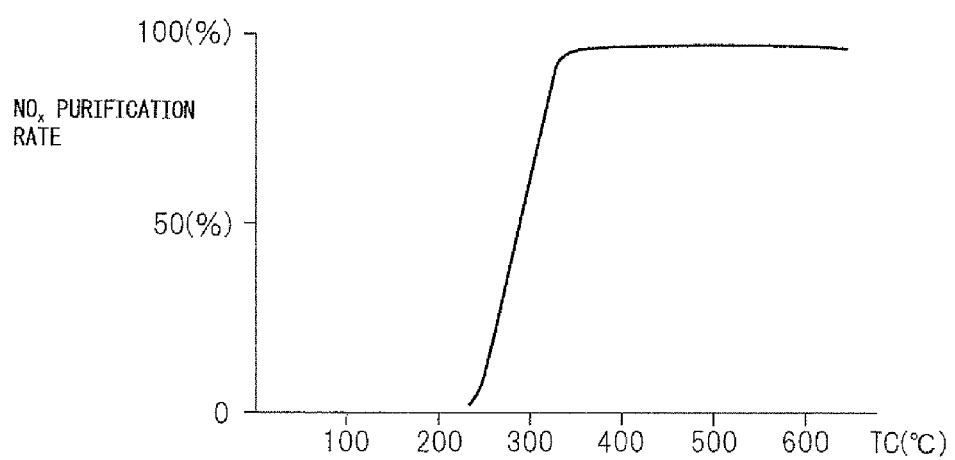
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
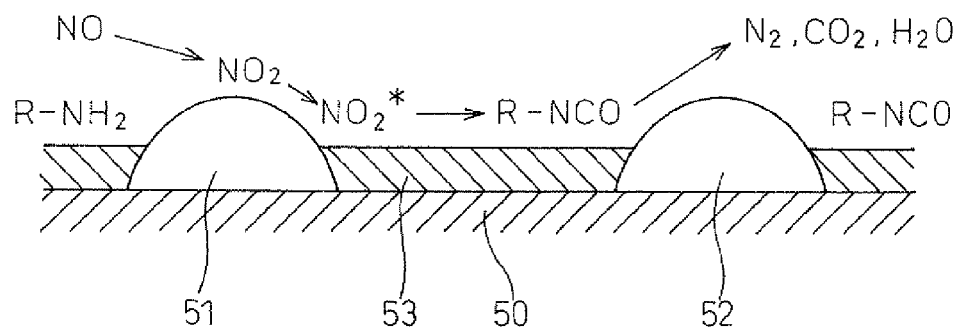
FIGS. 6A and 6B are views for explaining an oxidation reduction reaction in an exhaust purification catalyst.
Figure 6B:
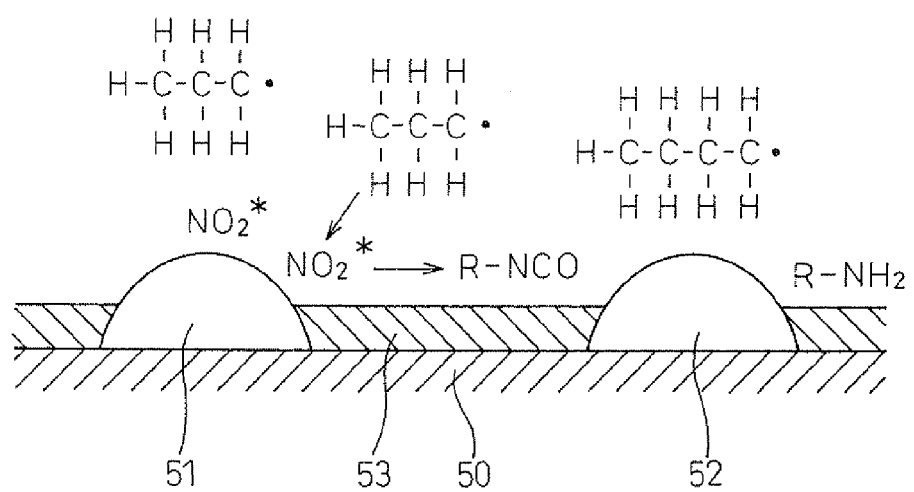

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. In this case, the main hydrocarbons play a central role in the production of the reducing intermediate, while the auxiliary hydrocarbons play an auxiliary role for the production of the intermediate. Therefore, first, referring to FIGS. 6A and 6B, the $NO_x$ purification action by the main hydrocarbons will be explained. Note that, these FIGS. 6A and 6B schematically show the surface part of the catalyst carrier 50 of the exhaust purification catalyst 13. These FIGS. 6A and 6B show the reactions believed to occur when the concentration of main hydrocarbons which flow into the exhaust purification catalyst 13 is made to vibrate within a predetermined range of amplitude and within a predetermined range of period.

FIG. 6A shows when the concentration of main hydrocarbons which flow into the exhaust purification catalyst 13 is low, while FIG. 6B shows when the main hydrocarbons are fed from the hydrocarbon feed valve 15 and the concentration of main hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the $NO_x$ which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if the main hydrocarbons are fed from the hydrocarbon feed valve 15, as shown in FIG. 3, the main hydrocarbons are reformed inside the exhaust purification catalyst 13 and become radicalized. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 6B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HO and the reaction will not proceed any further. In this case, if the concentration of main hydrocarbons which flow into the exhaust purification catalyst 13 is made to fall and, due to this, the concentration of oxygen becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of main hydrocarbons which flow into the exhaust purification catalyst 13 higher, a reducing intermediate is produced, while by making the concentration of main hydrocarbons which flow into the exhaust purification catalyst 13 lower to raise the oxygen concentration, the active $NO_2^*$ reacts with the reducing intermediate where the $NO_x$ is removed. That is, to use the exhaust purification catalyst 13 to remove $NO_x$, it is necessary to periodically change the concentration of main hydrocarbons which flow into the exhaust purification catalyst 13.

Of course, in this case, it is necessary to raise the concentration of main hydrocarbons to a concentration sufficiently high for producing the reducing intermediate, while it is necessary to lower the concentration of main hydrocarbons to a concentration sufficiently lower for causing the produced reducing intermediate to react with the active $NO_2^*$. That is, it is necessary to change the concentration of main hydrocarbons which flow into the exhaust purification catalyst 13 within a predetermined range of amplitude. Note that, in this case, a sufficient amount of reducing intermediate R—NCO or R—$NH_2$ has to be held on the basic layer 53, that is, on the basic exhaust gas flow surface part 24, until the produced reducing intermediate reacts with the active $NO_2^*$. For this reason, the basic exhaust gas flow surface part 24 is provided.

On the other hand, if lengthening the feed period of the main hydrocarbons, in the time from when the main hydrocarbons are fed to when next the main hydrocarbons are fed, the time during which the oxygen concentration becomes high will become longer. Therefore, the active $NO_2^*$ will be absorbed in the basic layer 53 in the form of nitrates without producing a reducing intermediate. To avoid this, it is necessary to make the concentration of main hydrocarbons which flow into the exhaust purification catalyst 13 change by a predetermined range of period.

Therefore, in an embodiment of the present invention, to make the $NO_x$ which is contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. $NO_x$ is reduced by the reducing action of the reducing intermediate R—NCO or R—$NH_2$ held on the basic exhaust gas flow surface 54 and, the changing period of the main hydrocarbon concentration is made a changing period required for continued production of the reducing intermediate R—NCO or R—$NH_2$. Incidentally, in the example shown in FIG. 4, the injection interval is made 3 seconds.

Figure 7A:
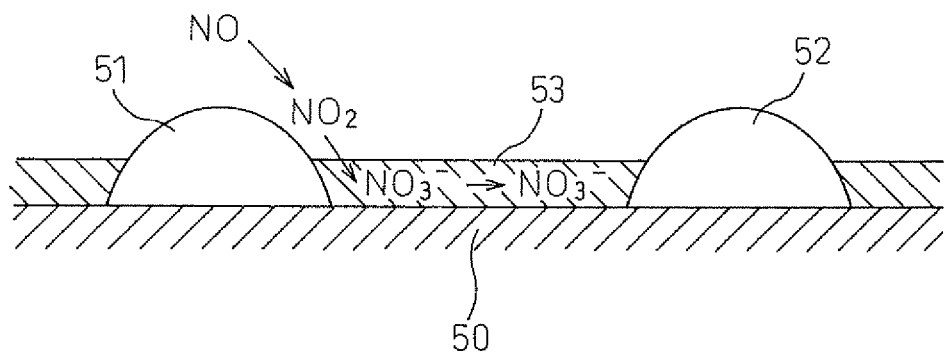
FIGS. 7A and 7B are views for explaining an oxidation reduction reaction in an exhaust purification catalyst.

If making the changing period of main hydrocarbon concentration, that is, the feed period of the main hydrocarbons HC, longer than the above predetermined range of period, the reducing intermediate R—NCO or R—$NH_2$ disappears from the surface of the basic layer 53. At this time, the active $NO_2^*$ which was produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
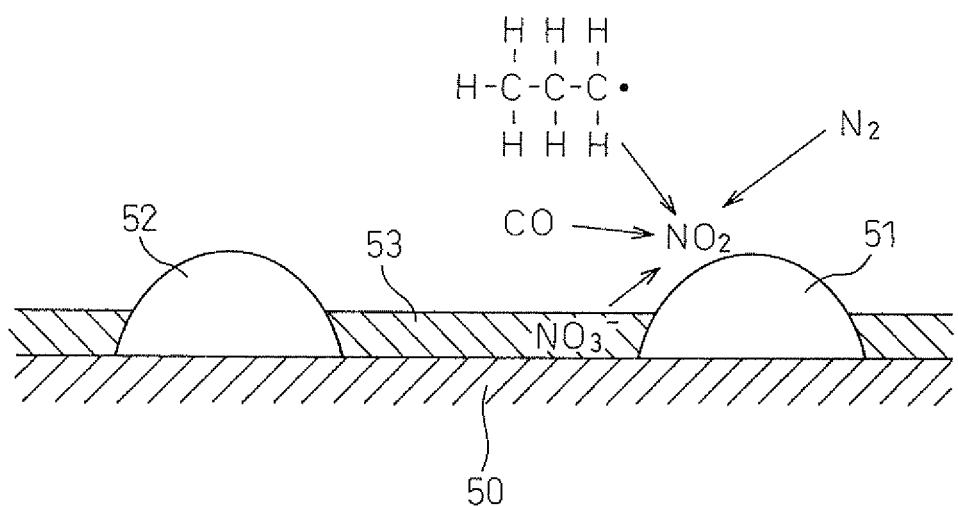

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
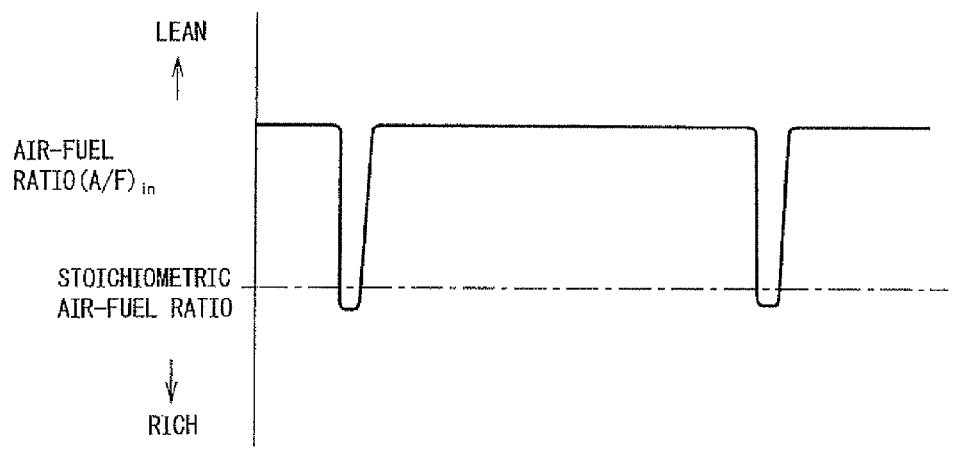
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and exhaust passage upstream of the exhaust purification catalyst 13 is referred to as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
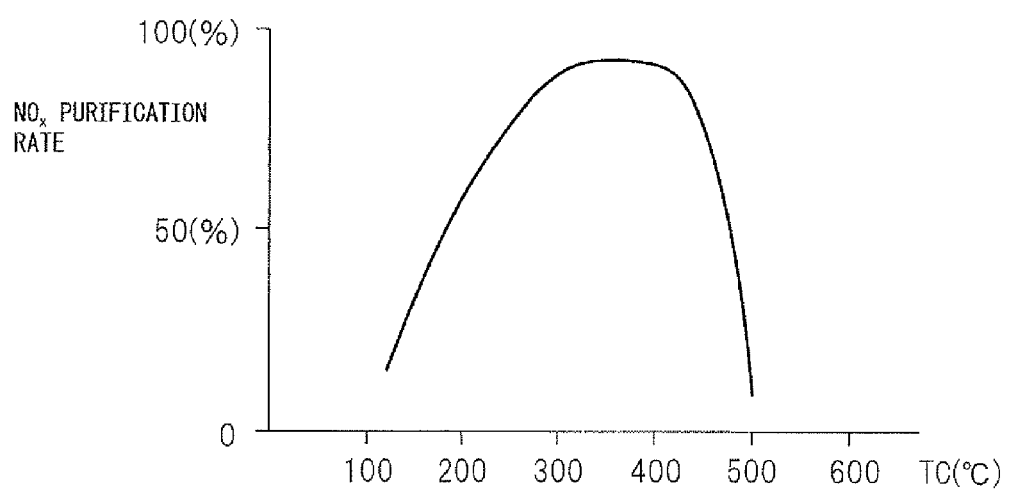
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, an exhaust purification catalyst 13 for reacting $NO_x$ contained in exhaust gas and reformed hydrocarbons is arranged inside of an engine exhaust passage, precious metal catalysts 51 and 52 are carried on the exhaust gas flow surface of the exhaust purification catalyst 13, a basic exhaust gas flow surface part 54 is formed around the precious metal catalysts 51 and 52, the exhaust purification catalyst 13 has the property of reducing the $NO_x$ which is contained in exhaust gas if the concentration of hydrocarbons flowing into the exhaust purification catalyst 13 is made to change within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, the concentration of main hydrocarbons which flow into the exhaust purification catalyst 13 is made to change within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
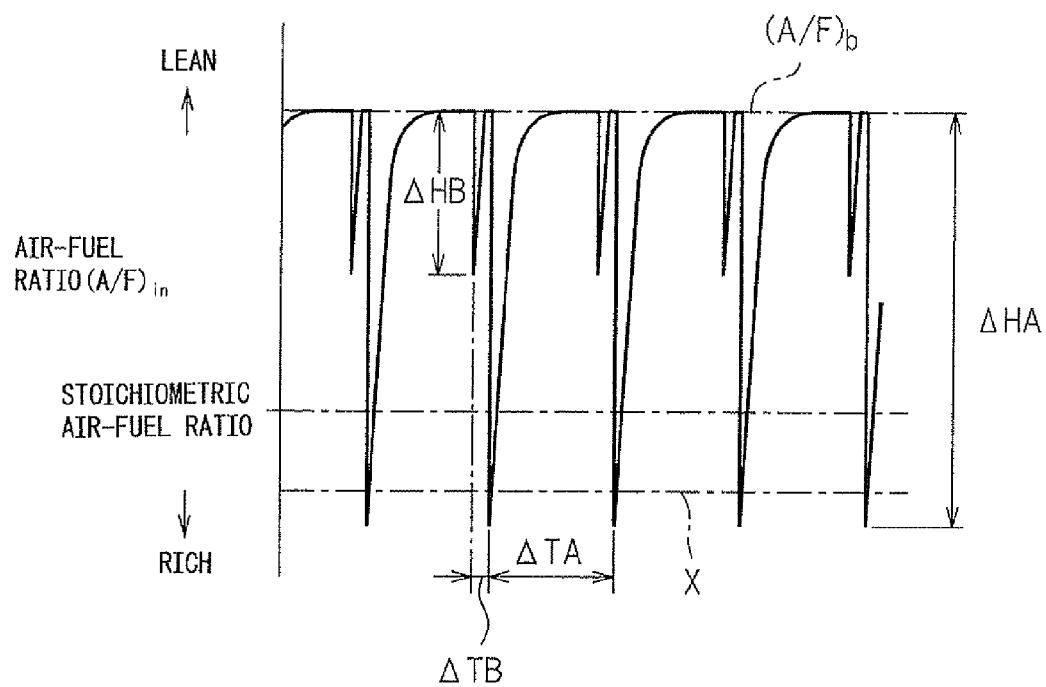
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔHA indicates the amplitude of the change in concentration of the main hydrocarbons HC which flow into the exhaust purification catalyst 13, while ΔTA indicates the changing period of the concentration of main hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for producing the reducing intermediate without the produced active $NO_2^*$ being stored in the form of nitrates inside the basic layer 53 at the time of feed of the main hydrocarbons. To make the active $NO_2^*$ and the reformed hydrocarbons react and produce the reducing intermediate, it is necessary to make the air-fuel ratio (A/F)in lower than the upper limit X of this air-fuel ratio.

In other words, in FIG. 10, X shows the lower limit of the concentration of main hydrocarbons required for making the active $NO_2^*$ and reformed main hydrocarbons react to produce a reducing intermediate. To produce the reducing intermediate, the concentration of main hydrocarbons has to be made higher than this lower limit X. In this case, whether the reducing intermediate is produced is determined by the ratio of the oxygen concentration and main hydrocarbon concentration around the active $NO_2^*$, that is, the air-fuel ratio (A/F) in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in at the time of feeding the main hydrocarbons is instantaneously made the demanded minimum air-fuel ratio X or less, that is, rich. As opposed to this, in the example shown in FIG. 11, the demanded minimum air-fuel ratio X is lean. In this case, at the time of feeding the main hydrocarbons, the reducing intermediate is formed by periodically reducing the air-fuel ratio (A/F)in while maintaining the air-fuel ratio (A/F)in lean.

In this regard, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
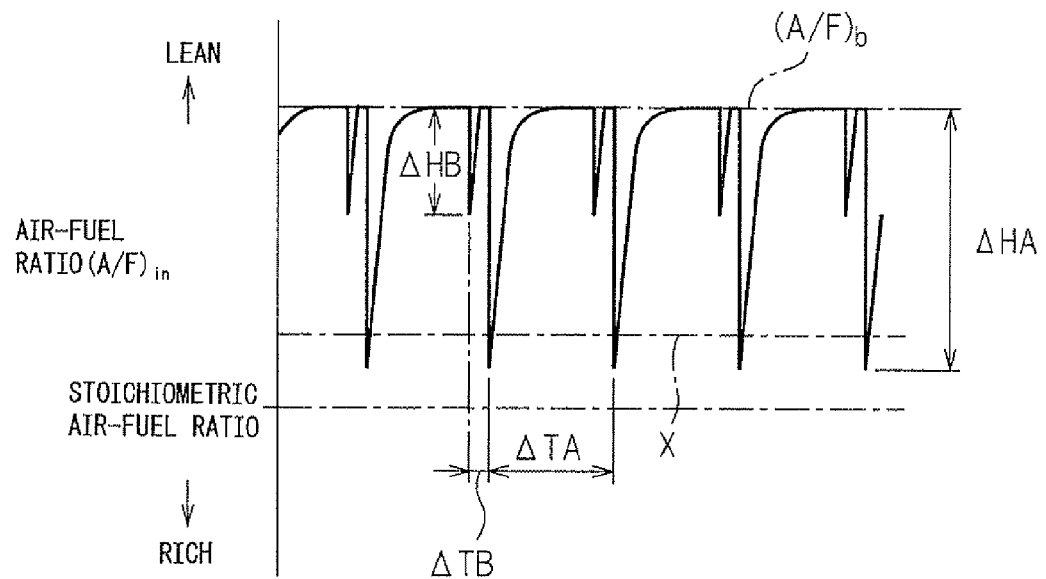
FIG. 11 is a time chart showing a change of an air-fuel ratio of exhaust gas flowing into an exhaust purification catalyst.

Now, when using an exhaust purification catalyst 13 with a strong oxidizing strength, as shown in FIG. 11, if maintaining the air-fuel ratio (A/F)in lean while periodically making the air-fuel ratio (A/F)in drop at the time of feed of the main hydrocarbons, when the air-fuel ratio (A/F)in is made to drop, the main hydrocarbons end up being completely oxidized and, as a result, the reducing intermediate can no longer be produced. As opposed to this, when using an exhaust purification catalyst 13 with a weak oxidizing strength, as shown in FIG. 10, if periodically making the air-fuel ratio (A/F)in at the time of feed of the main hydrocarbons rich, when the air-fuel ratio (A/F)in is made rich, the main hydrocarbons will be partially oxidized rather than being completely oxidized, that is, the main hydrocarbons will be reformed, and therefore the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically making the air-fuel ratio (A/F)in drop at the time of feed of the main hydrocarbons, the main hydrocarbons will be partially oxidized rather than being completely oxidized, that is, the main hydrocarbons will be reformed, and therefore the reducing intermediate will be produced. As opposed to this, when using an exhaust purification catalyst 13 with a weak oxidizing strength, as shown in FIG. 10, if periodically making the air-fuel ratio (A/F)in at the time of feed of the main hydrocarbons rich, a large amount of the main hydrocarbons will be exhausted from the exhaust purification catalyst 13 without being oxidized, therefore the amount of wastefully consumed hydrocarbons will increase. Therefore, when using an exhaust purification catalyst 13 with a weak oxidizing strength, the demanded minimum air-fuel ratio X has to be made lean.

Figure 12:
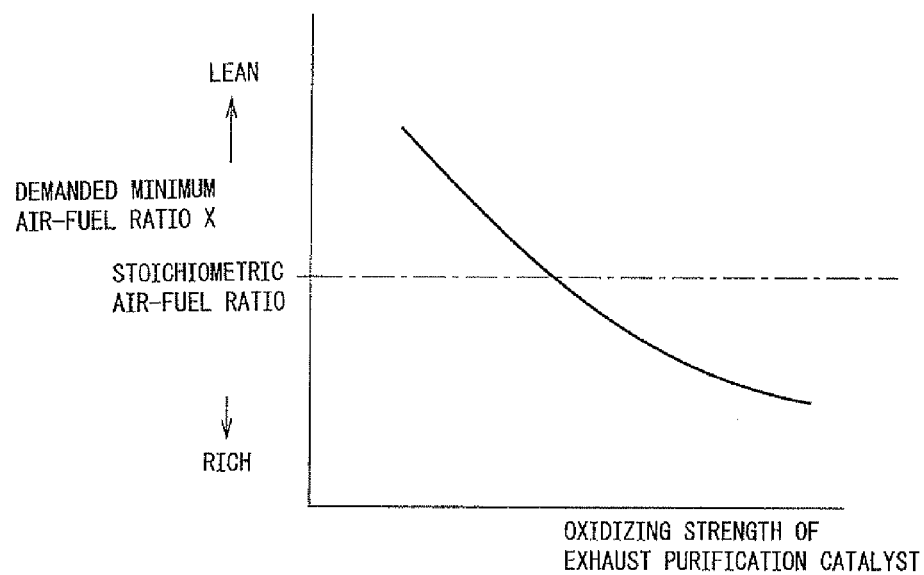
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, using as an example the case where the demanded minimum air-fuel ratio X is rich, the amplitude of the change in the concentration of main hydrocarbons which flow into the exhaust purification catalyst 13 and the changing period of the concentration of the main hydrocarbons which flow into the exhaust purification catalyst 13 will be explained.

Now, if the base air-fuel ratio (A/F)b becomes larger, that is, if the oxygen concentration in the exhaust gas before the main hydrocarbons are fed becomes higher, the feed amount of the main hydrocarbons necessary for making the air-fuel ratio (A/F)in the demanded minimum air-fuel ratio X or less increases and, along with this, the amount of excess hydrocarbons which do not contribute to the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas is high before the main hydrocarbons are fed, it is necessary to raise the oxygen concentration in the exhaust gas after the main hydrocarbons are fed. That is, it is necessary to increase the amplitude of the main hydrocarbon concentration the higher the oxygen concentration in the exhaust gas before the main hydrocarbons are fed.

Figure 13:
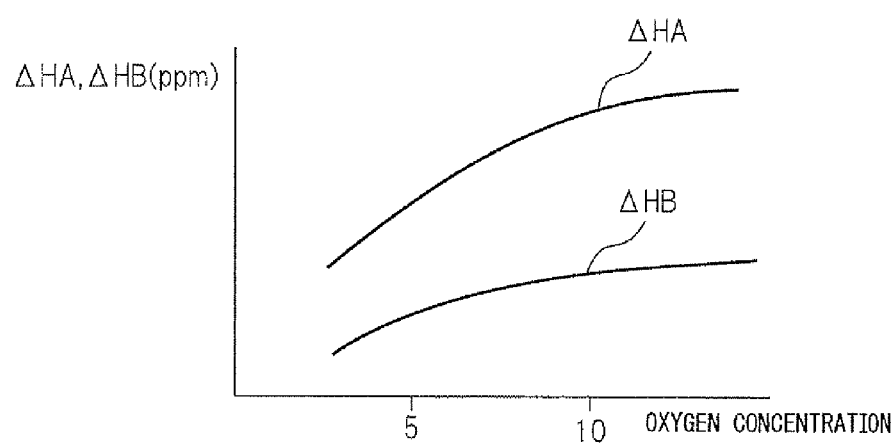
FIG. 13 is a view showing a relationship between an oxygen concentration in exhaust gas and an amplitude AH of a hydrocarbon concentration giving the same $NO_x$ purification rate.

FIG. 13 shows the relationship between the oxygen concentration in the exhaust gas before the main hydrocarbons are fed and the amplitude ΔHA of the main hydrocarbon concentration when the same $NO_x$ purification rate is obtained. From FIG. 13, it is learned that to obtain the same $NO_x$ purification rate, it is necessary to increase the amplitude ΔHA of the main hydrocarbon concentration the higher the oxygen concentration in the exhaust gas before the main hydrocarbons are fed. That is, to obtain the same $NO_x$ purification rate, it is necessary to increase the amplitude $\Delta HA$ of the main hydrocarbon concentration the higher the base air-fuel ratio (A/F)b becomes. In other words, to remove the $NO_x$ well, the lower the base air-fuel ratio (A/F)b, the more the amplitude $\Delta HA$ of the main hydrocarbon concentration can be reduced.

Figure 14:
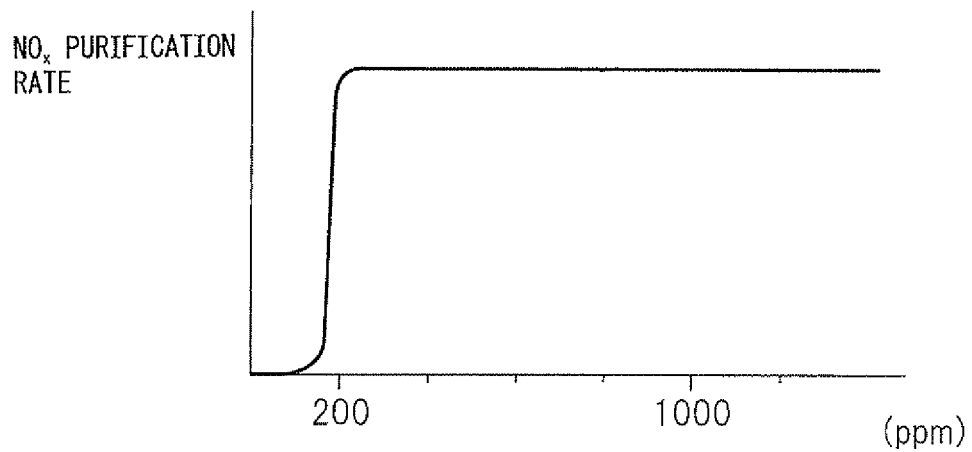
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude $\Delta HA$ of the main hydrocarbon concentration is about 200 ppm, it is possible to remove the $NO_x$ well. The base air-fuel ratio (A/F)b is usually larger than at the time of acceleration. Therefore, as shown in FIG. 14, if the amplitude $\Delta HA$ of the main hydrocarbon concentration is 200 ppm or more, a good $NO_x$ purification rate can be obtained.

On the other hand, it is learned that when the base air-fuel ratio (A/F)b is the highest, if making the amplitude $\Delta HA$ of the main hydrocarbon concentration about 10000 ppm, a good $NO_x$ purification rate is obtained. Therefore, in the present invention, the predetermined range of the amplitude $\Delta HA$ of the main hydrocarbon concentration is made 200 ppm to 10000 ppm.

Figure 15:
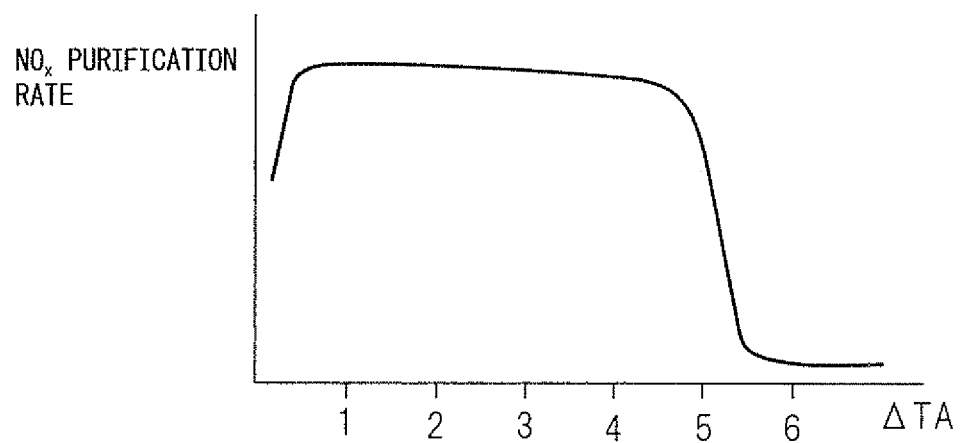
FIG. 15 is a view showing a relationship of a vibration period ΔT of a hydrocarbon concentration and an $NO_x$ purification rate.

Further, if the changing period $\Delta TA$ of the main hydrocarbon concentration becomes longer, in the time after the main hydrocarbons are fed to when the main hydrocarbons are next fed, the concentration of oxygen around the active $NO_2^*$ will become higher. In this case, if the changing period $\Delta TA$ of the main hydrocarbon concentration becomes longer than about 5 seconds, the active $NO_2^*$ starts to be absorbed in the form of nitrates in the basic layer 53. Therefore, as shown in FIG. 15, if the changing period $\Delta TA$ of main hydrocarbon concentration becomes longer than about 5 seconds, the $NO_x$ purification rate will fall. Therefore, the changing period $\Delta TA$ of the main hydrocarbon concentration has to be made 5 seconds or less.

On the other hand, if the changing period $\Delta TA$ of main hydrocarbon concentration becomes about 0.3 second or less, the fed main hydrocarbons will start to build up on the exhaust gas flow surface of the exhaust purification catalyst 13. Therefore, as shown in FIG. 15, if the changing period $\Delta TA$ of main hydrocarbon concentration becomes about 0.3 second or less, the $NO_x$ purification rate falls. Therefore, in the present invention, the changing period of main hydrocarbon concentration is made between 0.3 second to 5 seconds.

Figure 16A:
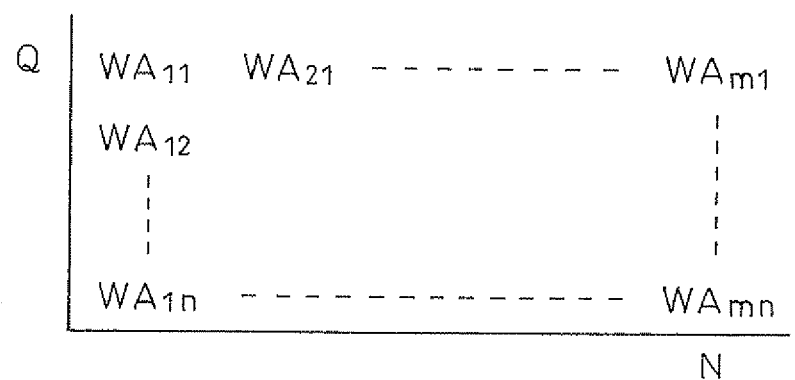
FIGS. 16A and 16B are views showing maps of hydrogen feed amounts WA and WB.

Now, in the present invention, by changing the main hydrocarbon feed amount and injection timing from the hydrocarbon feed valve 15, the amplitude $\Delta HA$ of the main hydrocarbon concentration and feed period $\Delta TA$ are controlled so as to become the optimum values in accordance with the engine operating state. In this case, in this embodiment of the present invention, the main hydrocarbon feed amount WA which enables this optimum amplitude $\Delta HA$ of the main hydrocarbon concentration to be obtained is stored as a function of the injection amount Q from a fuel injector 3 and engine speed N in the form of a map such as shown in FIG. 16A in advance in the ROM 32.

Next, the effect of the feed of the auxiliary hydrocarbons on the $NO_x$ purification rate will be explained.

As explained before, if the main hydrocarbons are fed, the main hydrocarbons become radical hydrocarbons with a small carbon number due to the catalyst 51. The radical hydrocarbons react with the active $NO_2^*$ on the catalyst 51 whereby the reducing intermediate R—NCO or R—$NH_2$ is produced. Next, this reducing intermediate reacts with the active $NO_2^*$ and becomes $N_2$, $CO_2$, and $H_2O$.

In this regard, when the main hydrocarbons are fed, if a large amount of oxygen remains on the exhaust purification catalyst 13, that is, at the catalyst 51, the number of catalyst surface parts causing a reaction between the radical hydrocarbons and active $NO_2^*$ on the catalyst 51 decreases, therefore the amount of production of the reducing intermediate falls. If the amount of production of the reducing intermediate falls, the $NO_x$ purification rate falls. In this case, the greater the amount of oxygen remaining on the exhaust purification catalyst 13, the lower the $NO_x$ purification rate.

In this way, to keep the $NO_x$ purification rate from falling, it is necessary to remove the oxygen remaining on the exhaust purification catalyst 13 before the feed of the main hydrocarbons. Therefore, in the present invention, to remove the residual oxygen on the exhaust purification catalyst 13, auxiliary hydrocarbons are fed before the feed of the main hydrocarbons. In this way, if auxiliary hydrocarbons are fed before the feed of the main hydrocarbons, the oxygen remaining at the exhaust purification catalyst 13 is consumed for oxidizing the auxiliary hydrocarbons, therefore when the main hydrocarbons are fed, the amount of oxygen remaining at the exhaust purification catalyst 13 can be reduced. As a result, a high $NO_x$ purification rate can be secured.

That is, as explained before, the exhaust purification catalyst 13 has the property of reducing the $NO_x$ which is contained in exhaust gas if the concentration of hydrocarbons flowing into the exhaust purification catalyst 13 is made to change within the predetermined range of amplitude and within the predetermined range of period and has the property of being increased in storage amount of $NO_x$ which is contained in exhaust gas if the vibration period of the hydrocarbon concentration is made longer than this predetermined range. In this case, in the present invention, as shown in FIGS. 10 and 11, at the time of engine operation, a main concentration changing action in which the concentration of hydrocarbons flowing into the exhaust purification catalyst 13 is made to change within the predetermined range of amplitude $\Delta HA$ and within the predetermined range of period $\Delta TA$ is performed and, furthermore, before each main concentration changing action, an auxiliary concentration changing action in which the hydrogen concentration is changed by an amplitude $\Delta HB$ smaller than the amplitude $\Delta HA$ at the time of each main concentration changing is performed.

In this case, the main concentration changing action is performed by the feed of the main hydrocarbons, while the auxiliary concentration changing action is performed by the feed of the auxiliary hydrocarbons. In this regard, the auxiliary hydrocarbons burn easier in a lean atmosphere than a rich atmosphere. Therefore, the residual oxygen on the exhaust purification catalyst 13 is consumed easier at the time of a lean atmosphere. Therefore, in this embodiment according to the present invention, as shown in FIG. 10 and FIG. 11, the feed of the auxiliary hydrocarbons, that is, the auxiliary concentration changing action, is performed while maintaining the air-fuel ratio of the exhaust gas flowing into the exhaust purification catalyst 13 lean.

On the other hand, the auxiliary hydrocarbons are mainly meant for consuming the residual oxygen, so the feed amount of the auxiliary hydrocarbons is considerably smaller compared with the feed amount of the main hydrocarbons. Therefore, as shown in FIGS. 10 and 11, the amplitude $\Delta HB$ of the hydrocarbon concentration due to the auxiliary hydrocarbons is considerably smaller than the amplitude $\Delta HA$ of the hydrocarbon concentration due to the main hydrocarbons.

Figure 16B:
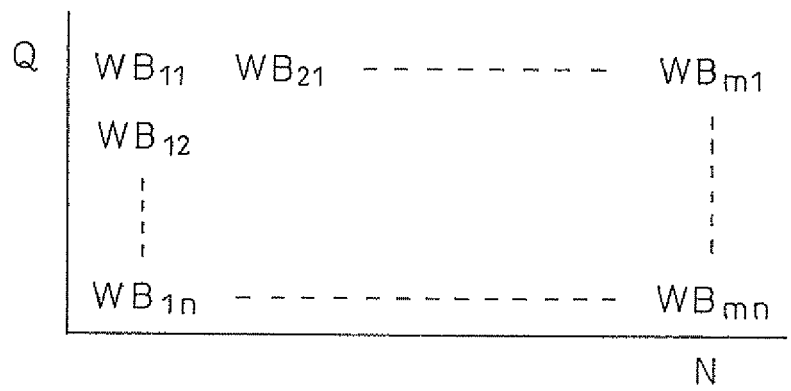

On the other hand, FIG. 13 shows the relationship between the oxygen concentration in the exhaust gas before the auxiliary hydrocarbons are fed and the amplitude $\Delta HB$ of the auxiliary hydrocarbons. In this regard, the higher the oxygen concentration in the exhaust gas before the auxiliary hydrocarbons are fed, the greater the amount of residual oxygen on the exhaust purification catalyst 13. Therefore, the higher the oxygen concentration in the exhaust gas before the auxiliary hydrocarbons are fed, the greater the amplitude ΔHB of the auxiliary hydrocarbons is made. In this embodiment according to the present invention, the hydrocarbon feed amount WB which enables the optimum amplitude ΔHB of the auxiliary hydrocarbon concentration to be obtained is stored as a function of the injection amount Q from the fuel injector 3 and engine speed N in the form of a map such as shown in FIG. 16B in advance in the ROM 32.

Note that, if feeding the auxiliary hydrocarbons, the heat of oxidation reaction of the hydrocarbons causes the temperature of the exhaust purification catalyst 13 to rise. That is, the auxiliary hydrocarbons also have the function of raising the temperature of the exhaust purification catalyst 13.

Next, referring to FIGS. 17A to 17C, the feed period ΔTA of the main hydrocarbons and the feed period ΔTB of the auxiliary hydrocarbons will be explained.

Figure 17A:
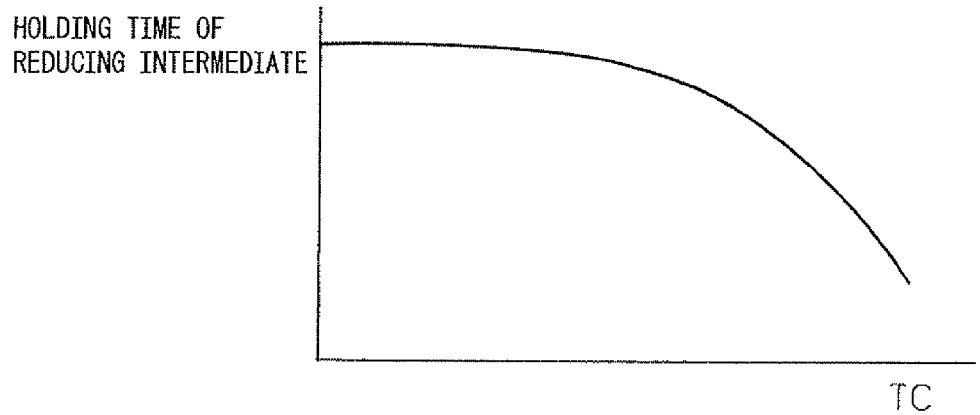
FIGS. 17A, 17B, and 17C are views showing the feed period ΔTA of the hydrocarbons etc. at the time of a main concentration changing action.

FIG. 17A shows the holding time of the reducing intermediate which is produced inside the exhaust purification catalyst 13. If the temperature TC of the exhaust purification catalyst 13 rises, the reducing intermediate is easily desorbed from the exhaust purification catalyst 13. Therefore, as shown in FIG. 17A, the holding time of the reducing intermediate becomes shorter as the temperature TC of the exhaust purification catalyst 13 becomes higher. In this regard, if the holding time of the reducing intermediate becomes shorter than the feed period ΔTA of the main hydrocarbons, a state will occur where there is no reducing intermediate and, as a result, the $NO_x$ purification rate will end up falling. At this time, to prevent the $NO_x$ purification rate from falling, the feed period ΔTA of the main hydrocarbons has to be made equal to the holding time of the reducing intermediate or has to be made shorter than the holding time of the reducing intermediate.

Figure 17B:
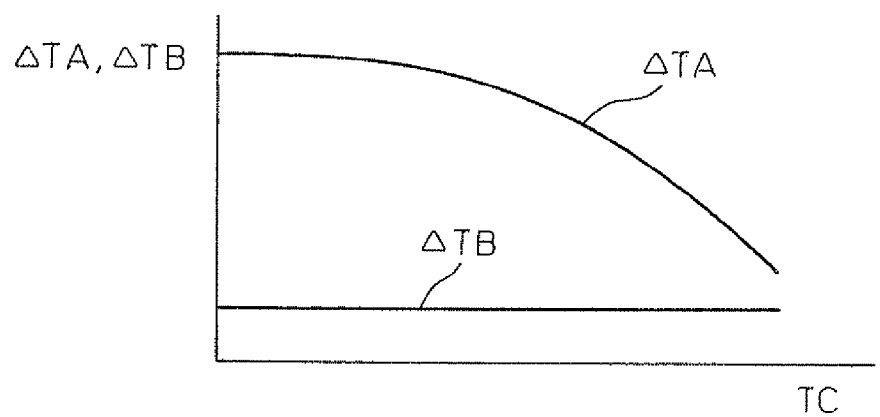
Figure 17C:
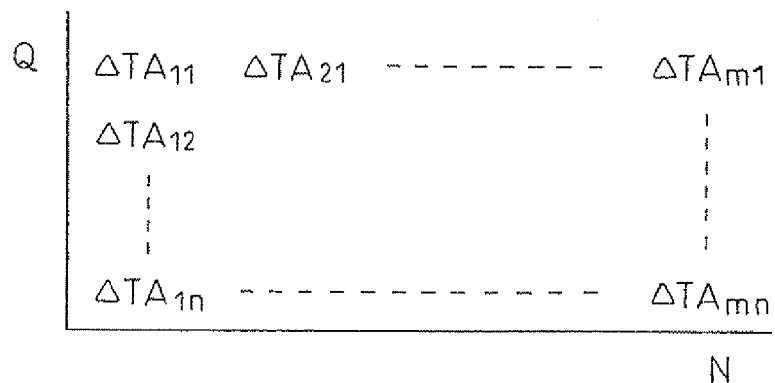

Therefore, in this embodiment according to the present invention, as shown in FIG. 17B, the feed period ΔTA of the main hydrocarbons is made shorter the higher the temperature TC of the exhaust purification catalyst 13. That is, the period ΔTA when the main concentration changing action is performed is made shorter as the temperature TC of the exhaust purification catalyst 13 becomes higher. In this embodiment according to the present invention, the feed period ΔTA of the main hydrocarbons is stored as a function of the injection amount Q from the fuel injector 3 and engine speed N in the form of a map shown in FIG. 17C in advance in the ROM 32.

On the other hand, as shown in FIGS. 10 and 11, the feed action of the auxiliary hydrocarbons is performed before a time ΔTB of the feed action of the main hydrocarbons. The feed of the auxiliary hydrocarbons, as explained before, is mainly for consuming the residual oxygen. In this case, this time ΔTB does not particularly have to be changed in accordance with the engine operating state. Therefore, in this embodiment according to the present invention, the feed of the auxiliary hydrocarbons is performed before the predetermined constant time ΔTB when the feed of the main hydrocarbons is performed. That is, the auxiliary concentration changing action is performed before the predetermined constant time ΔTB when each main concentration changing action is performed.

Next, referring to FIG. 18 to FIG. 21, an $NO_x$ purification method in the case when making the exhaust purification catalyst 13 function as an $NO_x$ storage catalyst will be specifically explained. The $NO_x$ purification method in the case when making the exhaust purification catalyst 13 function as an $NO_x$ storage catalyst in this way will be referred to below as the second $NO_x$ purification method.

Figure 18:
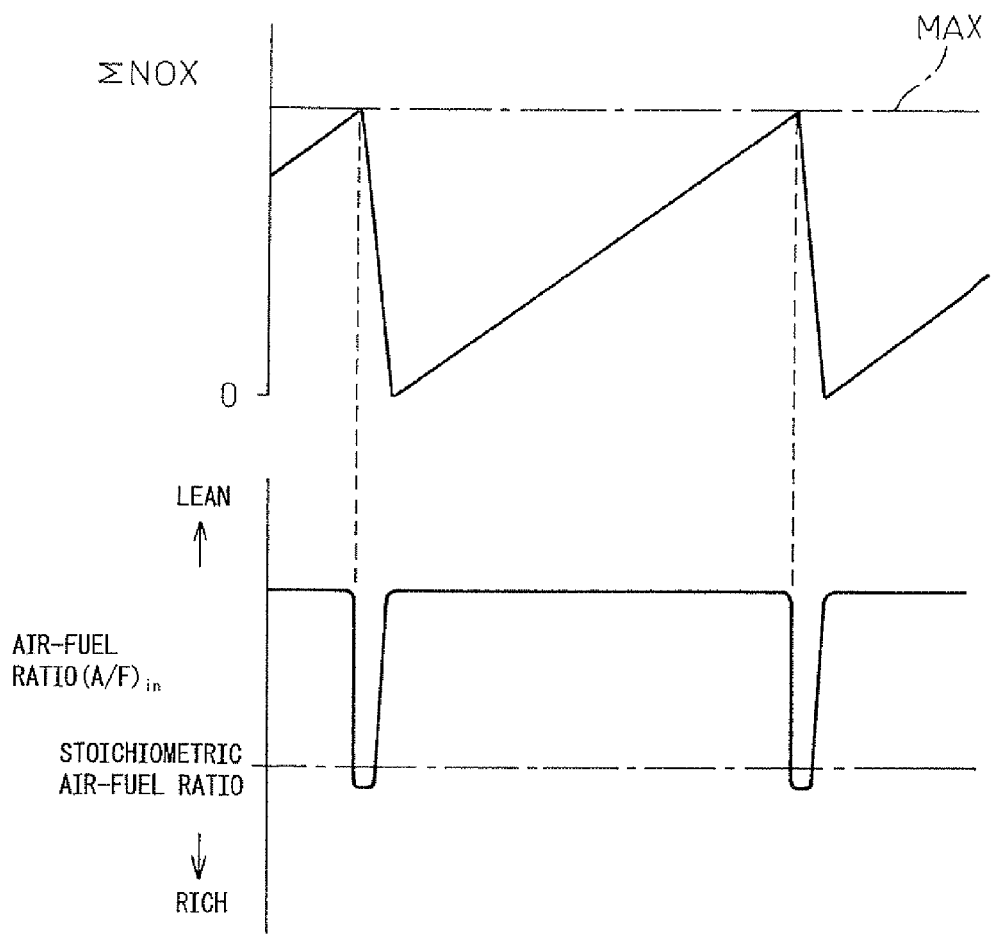
FIG. 18 is a view showing a change in the air-fuel ratio of the exhaust gas flowing to the exhaust purification catalyst etc.

In this second $NO_x$ purification method, as shown in FIG. 18, when the stored $NO_x$ amount ΣNOX of $NO_x$ which is stored in the basic layer 53 has exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_x$ which was stored in the basic layer 53 when the air-fuel ratio (A/F)in of the exhaust gas was lean is released from the basic layer 53 all at once and reduced. Due to this, the $NO_x$ is removed.

Figure 19:
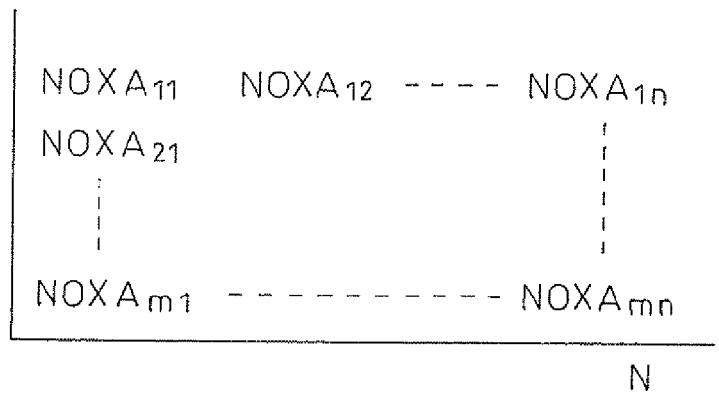
FIG. 19 is a view showing a map of an exhausted $NO_x$ amount NOXA.

The stored $NO_x$ amount ΣNOX is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 19 in advance in the ROM 32. The stored $NO_x$ amount ΣNOX is calculated from exhausted $NO_x$ amount NOXA. In this case, as explained before, the period in which the air-fuel ratio (A/F)in of the exhaust gas is made rich is usually 1 minute or more.

Figure 20:
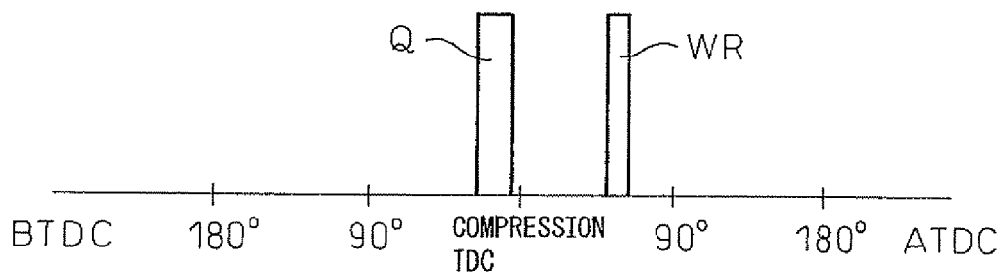
FIG. 20 is a view showing a fuel injection timing.
Figure 21:
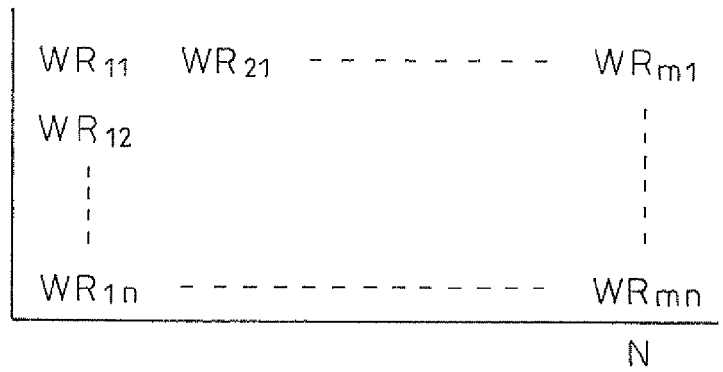
FIG. 21 is a view showing a map of a hydrocarbon feed amount WR.

In this second $NO_x$ purification method, as shown in FIG. 20, the fuel injector 3 injects additional fuel WR into the combustion chamber 2 in addition to the combustion-use fuel Q so that the air-fuel ratio (A/F)in of the exhaust gas flowing into the exhaust purification catalyst 13 is made rich. Note that, in FIG. 20, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 21 in advance in the ROM 32. Of course, in this case, it is also possible to make the amount of feed of hydrocarbons from the hydrocarbon feed valve 15 increase so as to make the air-fuel ratio (A/F)in of the exhaust gas rich.

Next, $NO_x$ release control according to the present invention will be explained.

Figure 22:
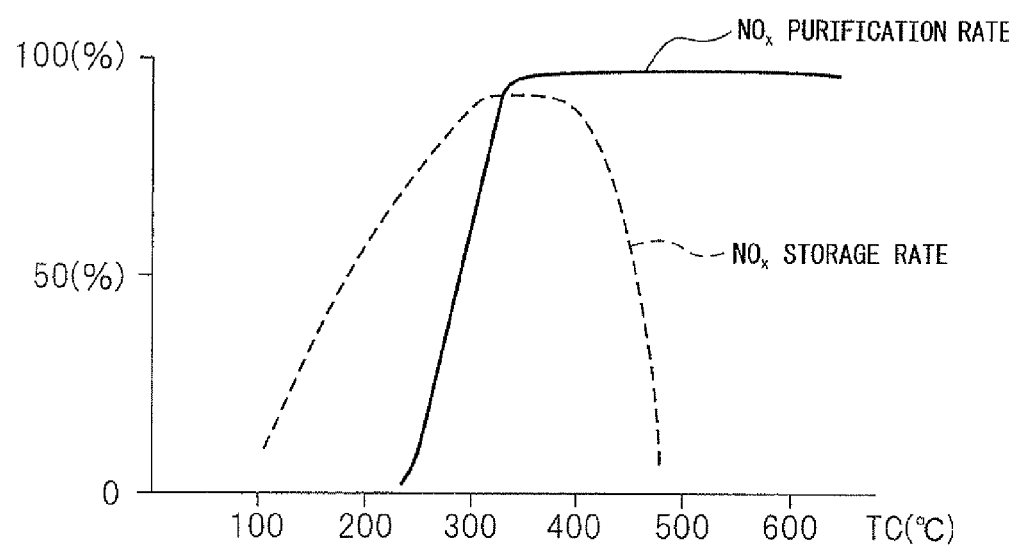
FIG. 22 is a view showing an $NO_x$ purification rate and $NO_x$ storage rate.

FIG. 22 shows the $NO_x$ purification rate when the first $NO_x$ purification method is used for $NO_x$ purification treatment and the $NO_x$ storage rate to the exhaust purification catalyst 13 when the second $NO_x$ purification method is used. In the present invention, when the $NO_x$ purification rate is higher than the $NO_x$ storage rate, that is, when the temperature TC of the exhaust purification catalyst 13 is relatively high, the first $NO_x$ purification method is used, while when the $NO_x$ storage rate is higher than the $NO_x$ purification rate, that is, when the temperature TC of the exhaust purification catalyst 13 is low, the second $NO_x$ purification method is used. Therefore, at the time of engine startup, normally the second $NO_x$ purification method is used. When the temperature TC of the exhaust purification catalyst 13 becomes high, the second $NO_x$ purification method is switched to the first $NO_x$ purification method.

Figure 23:
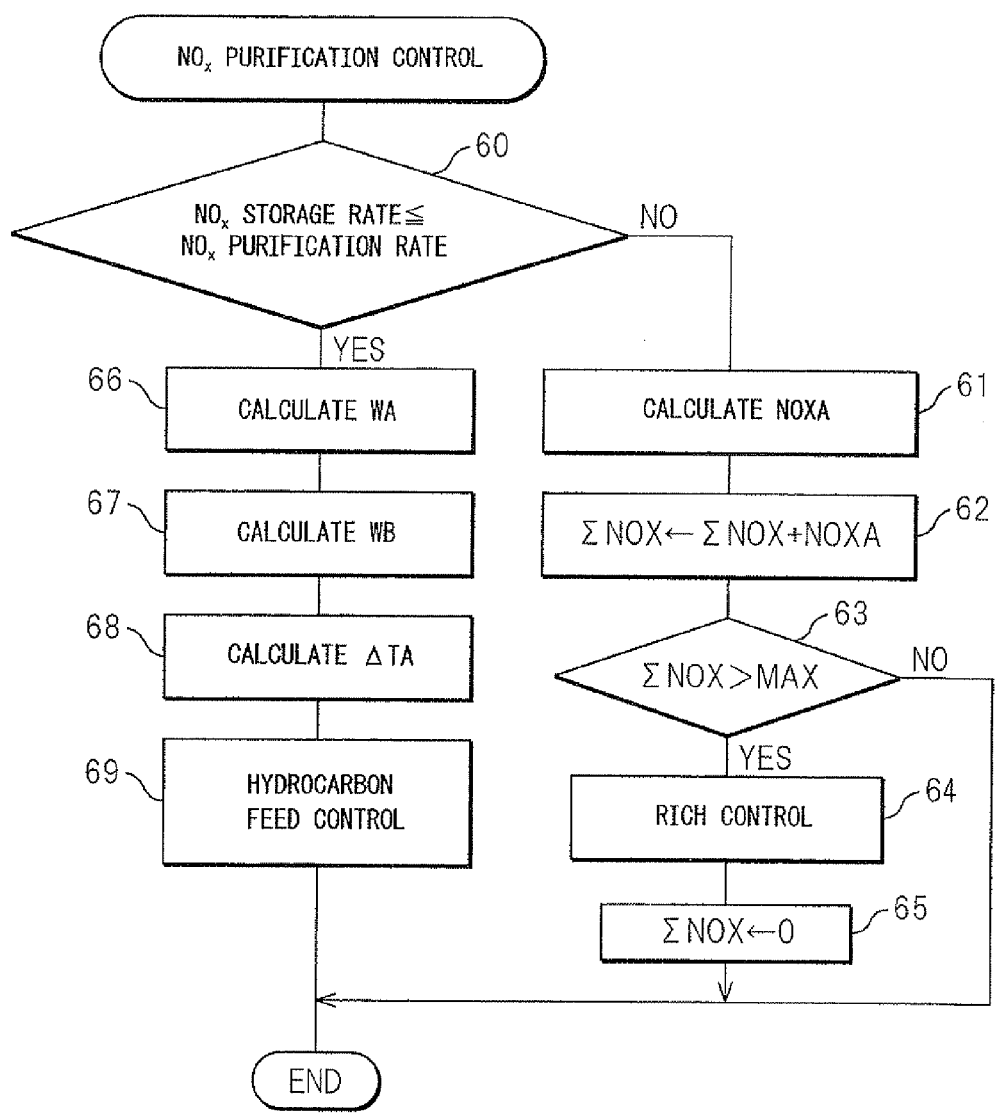
FIG. 23 is a flow chart for $NO_x$ purification control.

FIG. 23 shows the $NO_x$ purification control routine. This routine is executed by interruption every predetermined time.

Referring to FIG. 23, first, at step 60, it is judged if the $NO_x$ storage rate to the exhaust purification catalyst 13 when the second $NO_x$ purification method is used is lower than the $NO_x$ purification rate when the first $NO_x$ purification method is used for the $NO_x$ purification treatment. When the $NO_x$ storage rate is higher than the $NO_x$ purification rate, the routine proceeds to step 61 where the second $NO_x$ purification method is performed.

That is, at step 61, $NO_x$ amount NOXA exhausted per unit time is calculated from the map shown in FIG. 19. Next, at step 62, ΣNOX is incremented by the exhausted $NO_x$ amount NOXA to calculate the stored $NO_x$ amount ΣNOX. Next, at step 63, it is judged if stored $NO_x$ amount ΣNOX exceeds the allowable value MAX. When ΣNOX>MAX, the routine proceeds to step 64 where the additional fuel amount WR is calculated from the map shown in FIG. 21 and the injection action of additional fuel is performed. Next, at step 65, ΣNOX is cleared.

As opposed to this, when it is judged at step 60 that the $NO_x$ purification rate is higher than the $NO_x$ storage rate, the routine proceeds to step 66 where the first $NO_x$ purification method is performed. That is, at step 66, the feed amount WA of the main hydrocarbons is calculated from the map shown in FIG. 16A, next, at step 67, the feed amount WB of the auxiliary hydrocarbons is calculated from the map shown in FIG. 16B. Next, at step 68, the feed period ΔTA of the main hydrocarbons is calculated from the map shown in FIG. 17C. Next, at step 69, the feed of the auxiliary hydrocarbons and the main hydrocarbons is performed by using the calculated values of WA, WBΔ, and TA and the value of ΔTB.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. An exhaust purification system of an internal combustion engine, comprising:
an engine exhaust passage,
an exhaust purification catalyst for reacting NOx contained in exhaust gas and reformed hydrocarbons arranged inside of the engine exhaust passage, the exhaust gas purification catalyst including a precious metal catalyst on an exhaust gas flow surface of the exhaust purification catalyst and a basic exhaust gas flow surface part is formed around the precious metal catalyst,
the exhaust purification catalyst has a property of reducing the NOx which is contained in exhaust gas if a concentration of hydrocarbons flowing into the exhaust purification catalyst is made to change within a predetermined range of amplitude and within a predetermined range of period and has a property of being increased in storage amount of NOx which is contained in exhaust gas if a vibration period of the hydrocarbon concentration is made longer than the predetermined range, and
an electronic control unit configured to perform, at the time of engine operation, a main concentration changing action in which the concentration of hydrocarbons flowing into the exhaust purification catalyst is made to change within said predetermined range of amplitude and within said predetermined range of period, and
the electronic control unit is configured to perform, before each main concentration changing action, an auxiliary concentration changing action in which the concentration of hydrocarbons is made to change by an amplitude smaller than the amplitude at the time of each main concentration changing action.

2. An exhaust purification system of an internal combustion engine as claimed in claim 1, wherein said auxiliary concentration changing action is performed while maintaining an air-fuel ratio of the exhaust gas flowing into the exhaust purification catalyst lean.

3. An exhaust purification system of an internal combustion engine as claimed in claim 1, wherein said auxiliary concentration changing action is performed a predetermined constant time before each main concentration changing action is performed.

4. An exhaust purification system of an internal combustion engine as claimed in claim 1, wherein a period when said main concentration changing action is performed is made shorter the higher a temperature of the exhaust purification catalyst.

5. An exhaust purification system of an internal combustion engine as claimed in claim 1, wherein in said exhaust purification catalyst, $NO_x$ contained in exhaust gas and reformed hydrocarbons react whereby a reducing intermediate containing nitrogen and hydrocarbons is produced and wherein a changing period of the hydrocarbon concentration due to said main concentration changing action is a changing period necessary for continued production of the reducing intermediate.

6. An exhaust purification system of an internal combustion engine as claimed in claim 5, wherein the changing period of the hydrocarbon concentration due to said main concentration changing action is 0.3 second to 5 seconds.

7. An exhaust purification system of an internal combustion engine as claimed in claim 1, wherein said precious metal catalyst is comprised of platinum Pt and at least one of rhodium Rh and palladium Pd.

8. An exhaust purification system of an internal combustion engine as claimed in claim 1, wherein a basic layer containing an alkali metal, an alkali earth metal, a rare earth, or a metal which can donate electrons to $NO_x$ is formed on the exhaust gas flow surface of the exhaust purification catalyst and wherein the surface of said basic layer forms said basic exhaust gas flow surface part.

* * * * *